(12) United States Patent
Aaron

(10) Patent No.: US 8,234,703 B2
(45) Date of Patent: Jul. 31, 2012

(54) NETWORK FIREWALL HOST APPLICATION IDENTIFICATION AND AUTHENTICATION

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/891,082

(22) Filed: Sep. 27, 2010

(65) Prior Publication Data

US 2011/0023109 A1    Jan. 27, 2011

Related U.S. Application Data

(62) Division of application No. 10/610,806, filed on Jun. 30, 2003, now Pat. No. 7,827,602.

(51) Int. Cl.
*H04L 9/32* (2006.01)
*H04L 29/06* (2006.01)
*G06F 15/16* (2006.01)
*G06F 15/173* (2006.01)

(52) U.S. Cl. .............. 726/13; 726/11; 726/6; 709/225

(58) Field of Classification Search ............ 726/11, 726/6, 13; 709/223, 225, 229
See application file for complete search history.

(56) References Cited

U.S. PATENT DOCUMENTS

| | | | |
|---|---|---|---|
| 5,586,121 A | 12/1996 | Moura et al. | |
| 5,828,833 A * | 10/1998 | Belville et al. | 726/11 |
| 5,901,142 A | 5/1999 | Averbuch et al. | |
| 6,058,431 A | 5/2000 | Srisuresh et al. | |
| 6,801,528 B2 | 10/2004 | Nassar | |
| 6,865,184 B2 | 3/2005 | Thubert et al. | |
| 6,944,133 B2 | 9/2005 | Wisner et al. | |
| 7,072,341 B2 * | 7/2006 | Xu et al. | 370/392 |
| 7,073,046 B2 | 7/2006 | Sasvari | |
| 7,082,103 B2 | 7/2006 | Schieder et al. | |
| 7,222,228 B1 | 5/2007 | Stephens et al. | |
| 7,260,066 B2 | 8/2007 | Wang et al. | |
| 7,716,725 B2 * | 5/2010 | Xie | 726/11 |
| 7,765,313 B2 * | 7/2010 | Jain et al. | 709/230 |
| 7,836,494 B2 * | 11/2010 | Richardson et al. | 726/11 |
| 2003/0115435 A1 | 6/2003 | Sasvari | |
| 2006/0168213 A1 * | 7/2006 | Richardson et al. | 709/225 |

OTHER PUBLICATIONS

U.S. Official Action dated May 2, 2007 in U.S. Appl. No. 10/610,806.

(Continued)

*Primary Examiner* — Zachary A Davis
(74) *Attorney, Agent, or Firm* — Hope Baldauff Hartman, LLC

(57) ABSTRACT

Systems for providing information on network firewall host application identification and authentication include an identifying and transmitting agent on a host computer, configured to identify each application in use, tag the application identity with a host identity, combine these and other information into a data packet, and securely transmit the data packet to the network based firewall. The embodiment also includes an application identity listener on the network based firewall, configured to receive the information data packet, decode the data packet and provide to the network based firewall the identity of the application. The network based firewall is provided with an application-awareness via an extension of firewall filtering or security policy rules via the addition of a new application identity parameter upon which filtering can be based. Other systems and methods are also provided.

6 Claims, 8 Drawing Sheets

OTHER PUBLICATIONS

U.S. Official Action dated Jul. 25, 2008 in U.S. Appl. No. 10/610,806.

U.S. Official Action dated Apr. 14, 2009 in U.S. Appl. No. 10/610,806.

U.S. Official Action dated Nov. 24, 2009 in U.S. Appl. No. 10/610,806.

Kent et al., authors of "Security Architecture for the Internet Protocol," of BBN Corporation dated Nov. 1998; copyright, The Internet Society, 66 pages.

Notice of Allowance/Allowability dated Jun. 24, 2010 in U.S. Appl. No. 10/610,806.

* cited by examiner

NETWORK FIREWALL HOST APPLICATION IDENTIFICATION AND AUTHENTICATION

CROSS REFERENCE TO RELATED APPLICATIONS

This application is a divisional application of U.S. application Ser. No. 10/610,806 entitled "Network Firewall Host Application Identification and Authentication" filed Jun. 30, 2003 now U.S. Pat. No. 7,827,602, which is expressly incorporated in its entirety herein by reference.

TECHNICAL FIELD

The present invention is generally related to computer systems and, more particularly, is related to electronic network security systems.

BACKGROUND OF THE INVENTION

Typically, communications networks implement security via firewalls. Traditionally, firewalls are owned by the entity being protected and are operated by expert personnel. Consumer firewalls, such as software firewalls installed on personal computers (PCs) that connect to Internet via broadband (e.g., DSL), are owned and operated by the consumer who is generally not an expert and is ill-equipped to manage the firewall properly. This often results in considerable user frustration and improper firewall configuration (i.e., bad or nonexistent security).

One solution to these problems is the deployment of network-based firewalls placed in telecommunications provider networks that provide customers with experts who use appropriate methods and policies to manage the network-based firewalls. The telecommunications providers could offer this support to consumers as a service so that they do not have to try to implement and manage their own firewalls. However, network-based firewalls lack the ability to be reliably aware of exactly which applications are attempting to communicate through them. Therefore, the existing network-based firewalls are restricted to filtering based only on the application-transmitted packets and packet types traversing the network, which are detectable as these pass through the firewall. Thus, the network-based firewall can provide inbound protection, in terms of filtering packets from the Internet, but cannot provide sufficient outbound protection, resulting in what is known as a "leaky" firewall.

"Leakiness" encompasses two major problems. First, the firewall cannot stop a virus, Trojan, or other mal-ware from pretending to be a common "allowed" or "authorized" application (e.g., a web browser) and thus communicating without hindrance to nefarious entities out on the Internet. For instance, a Trojan could easily monitor keystrokes, collect user identification and passwords or other sensitive information, and then surreptitiously provide that information to collector web sites or servers in foreign countries beyond the reach of law enforcement. Thus, by using the Hyper Text Transfer Protocol (HTTP) or others allowed for web surfing, the Trojan would circumvent firewall filtering since the firewall must allow http to pass unhindered.

Second, it is difficult to configure the firewall properly without being able to filter on applications. The user often does not know, and cannot know, exactly what packet types or protocols applications use. Especially with a network-based firewall, which is remote from the host, it is difficult to determine the exact packet/protocol filtering to use, even for expert administrators. The problem is compounded with new applications, which may use a number of protocols or ports (e.g., networked games), and may change ports during operation (e.g., port-agile applications such as video over IP (VoIP)).

Thus, heretofore-unaddressed needs exist for a solution that addresses the aforementioned and other deficiencies and inadequacies.

SUMMARY OF THE INVENTION

Preferred embodiments of the present invention provide for network firewall host application identification and authentication. Briefly described, in architecture, one embodiment, among others, can be implemented to include an identifying and transmitting agent configured to identify the exact application in use, tag that application knowledge with a host computer identity to be inserted into a data packet, and subsequently transmit the data packet to the network based firewall. The embodiment also includes an application identity listener configured to receive the data packet, decode the data packet and provide to the network based firewall the identity of the application on the host computer where the identifying and transmitting agent resides.

One embodiment, among others, can be broadly summarized by the following steps: identifying an application from a host computer; authenticating the identified application; tagging identified application information with an identity of the host computer; and conveying the tagged information in a secure manner to the network based firewall.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for network firewall host application identification and authentication. To facilitate description of the inventive system, an example system that can be used to implement the network firewall host application identification and authentication is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide network firewall host application identification and authentication.

Figure 1:
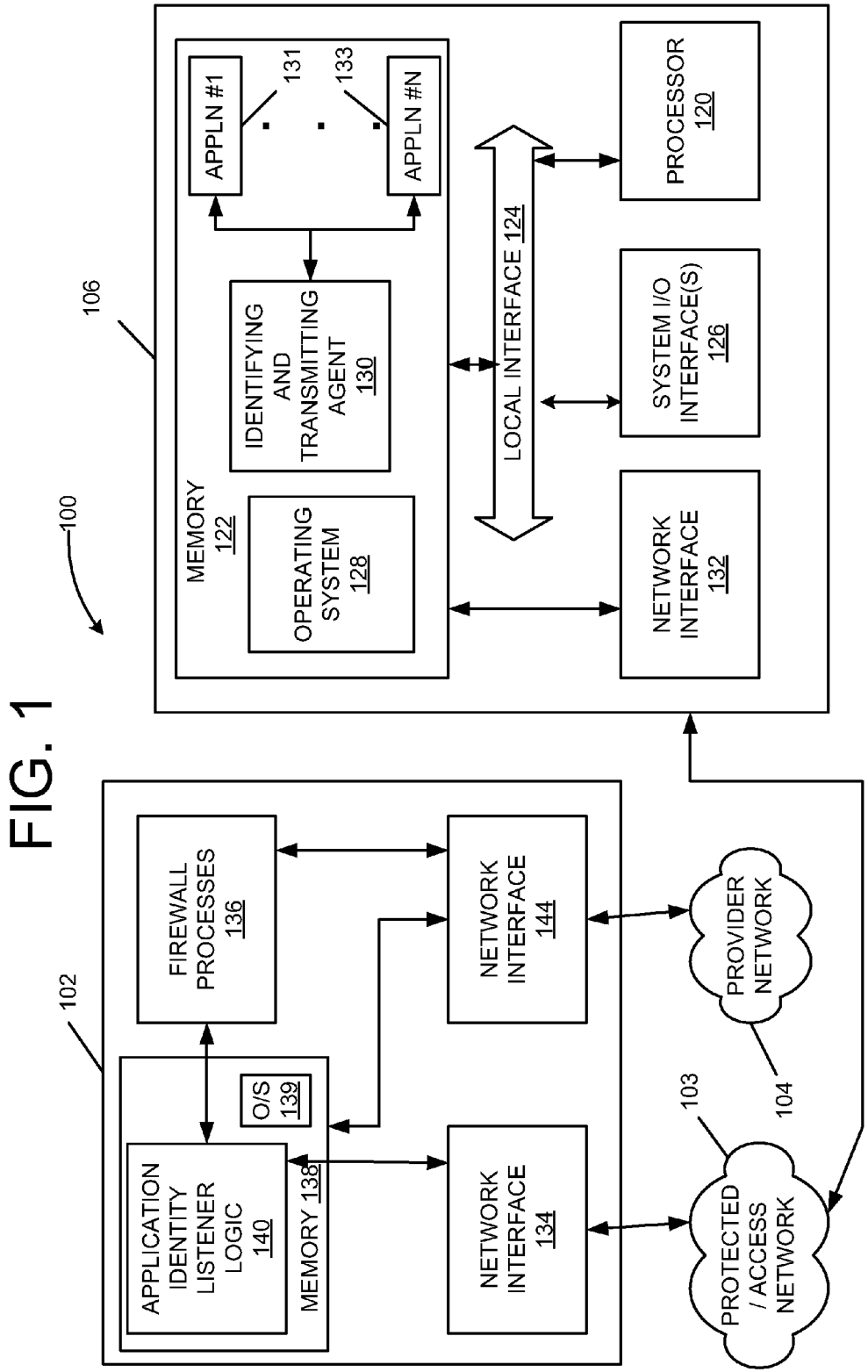
FIG. 1 is a block diagram depicting a preferred embodiment of a system for network firewall host application identification and authentication.

Referring now in more detail to the drawings, in which like numerals indicate corresponding parts throughout the several views, FIG. 1 is a block diagram depicting a preferred embodiment of a system 100 for network firewall host application identification and authentication. The system 100 includes a network-based firewall processing device (referred to as a network-based firewall) 102 that can be used to implement a preferred embodiment of an application identity listener (AIL), a protected/access network 103, a provider network 104, and a host computing device 106 that can be used to implement an identifying and transmitting agent (ITA). The protected access network 103 and the provider network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. In a preferred embodiment, the protected/access network 103 is configured as the network which connects the host computing device 106 to the network-based firewall 102 and thereby to the provider network 104, which may include the Internet, as one example, among others.

Generally, in terms of hardware architecture, as shown in FIG. 1, the host computing device 106 includes, inter alia, a processor 120 and memory 122. Input and/or output (I/O) devices (or peripherals) can be communicatively coupled to a local interface 124 via a system I/O interface 126, or directly connected to the local interface 124. The local interface 124 can be, for example but not limited to, one or more buses or other wired or wireless connections, as is known in the art. The local interface 124 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software, particularly that stored in memory 122. The processor 120 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 122 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 122 may incorporate electronic, magnetic, optical, and/or other types of storage media. Note that the memory 122 can have a distributed architecture, where various components are situated remote from one another, but can be accessed by the processor 120.

The software and/or firmware in memory 122 may include one or more separate programs, each of which comprises an ordered listing of executable instructions for implementing logical functions. In the example of FIG. 1, the software in the memory 122 can include logic such as the ITA 130, software/logic applications 131 through 133, and a suitable operating system (O/S) 128. The operating system essentially controls the execution of other computer programs, and provides scheduling, input-output control, file and data management, memory management, and communication control and related services.

The ITA 130 is a source program, executable program (object code), script, or any other entity comprising a set of instructions to be performed. When the ITA 130 is implemented as a source program, then the program needs to be translated via a compiler, assembler, interpreter, or the like, which may or may not be included within the memory 122, so as to operate properly in connection with the O/S. Furthermore, ITA 130 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. The I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the ITA 130 is implemented in software, as is shown in FIG. 1, it should be noted that ITA 130 can be stored on any computer-readable medium for use by or in connection with any computer related system or method. When the AIL 140 is implemented in software, it can also be stored on any computer-readable medium for use by or in connection with any computer related system or method, similar to embodiments described below for the ITA 130. The ITA 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ITA 130 is implemented in hardware, the ITA 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A plurality of applications such as application #1 131 to application #N 133 is operatively coupled to memory 122. Applications may include, for example, among many others, web browsers, anti-virus update software, instant messaging software, chat software, audio/video conferencing software, etc. The host computer 106 further includes a network interface 132 (such as an adapter card, e.g., network interface card (NIC), among others). In a preferred embodiment, the network interface 132 is utilized for communicating with the network-based firewall 102 via a network interface 134.

In a preferred embodiment, the ITA 130 resides on the host computer 106, and is arranged such that it can detect whenever packets are transmitted en route to the network-based firewall 102. In a preferred embodiment, the ITA 130 is configured so that it can transmit messages to the network-based firewall 102 via the network interface 132. In a preferred embodiment, the ITA (or at least key portions of it) resides between the host computer's applications 131, 133 and the host computer's network interface 132.

The network-based firewall 102 includes the network interface 134, firewall processes 136 including computing processing (not shown) such as processor, system interfaces, local interfaces, among others, memory 138, and a network interface 144. The network interface 134 is used to communicate with the protected/access network 103, while the network interface 144 is used to communicate with the provider network 104. The software and/or firmware in memory 138 may include one or more separate programs, each of which comprises an ordered listing of executable instructions for implementing logical functions. In the example of FIG. 1, the software in the memory 138 can include application identity listener (AIL) logic 140, and a suitable operating system (O/S) 139. The operating system 139 preferably controls the execution of other computer programs, and provides scheduling, input-output control, file and data management, memory management, and communication control and related services, among others. In an alternative preferred embodiment, the network-based firewall 102 includes an optional reverse translation module (not shown) configured to provide reverse-port translation.

Figure 2:
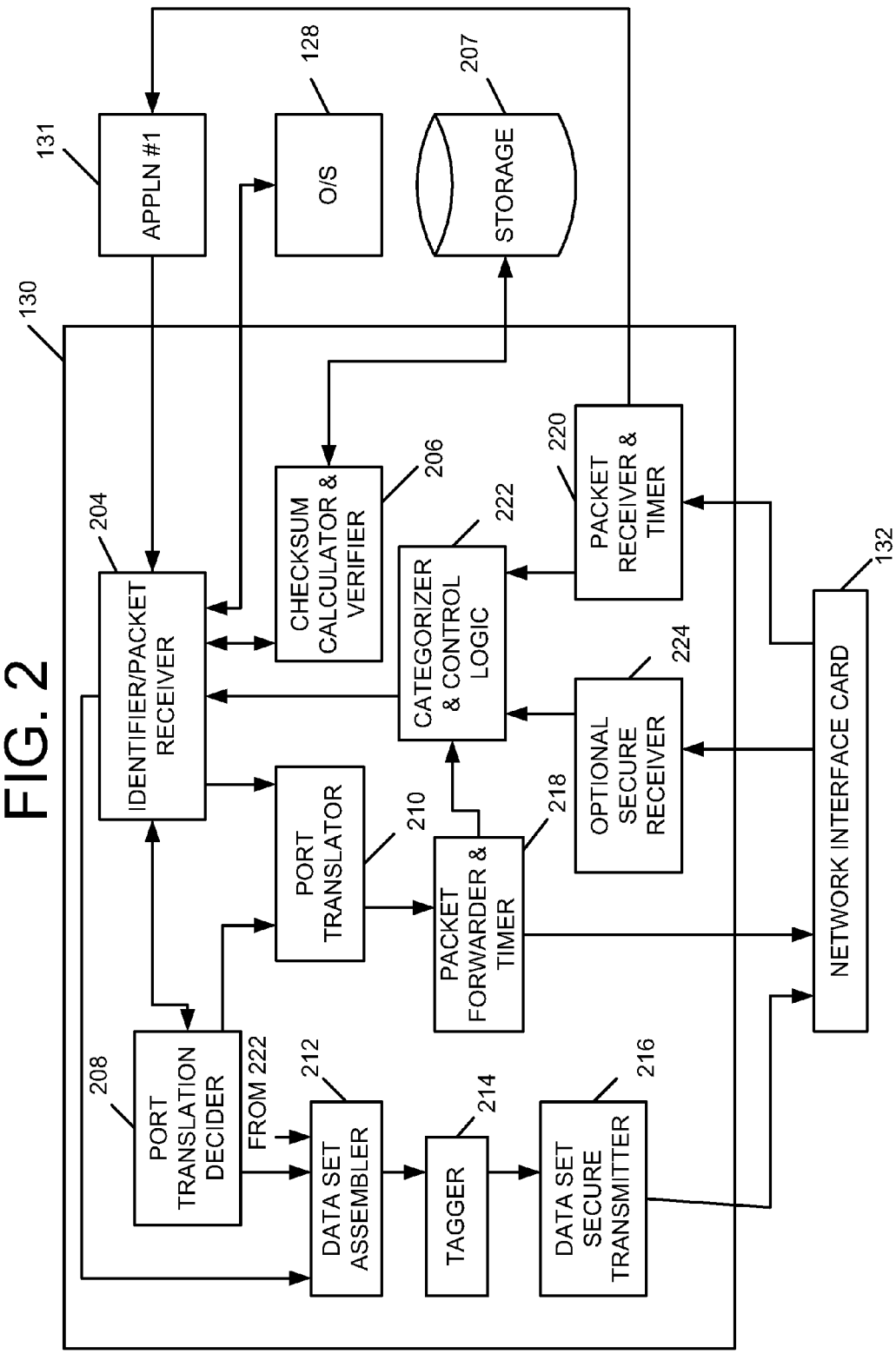
FIG. 2 is a block diagram depicting a preferred embodiment of an identifying and transmitting agent of a system for network firewall host application identification and authentication.

FIG. 2 is a block diagram depicting a preferred embodiment of an identifying and transmitting agent (ITA) of a system for network firewall host application identification and authentication. As shown in FIG. 1, the ITA 130 exists in memory 122 of FIG. 1. In other embodiments, the ITA 130 is resident in an identifying and transmitting device, utilizing the device hardware. In a preferred embodiment, the ITA 130 includes a plurality of modules such as an identifier/packet receiver 204, checksum calculator and verifier 206, port translation decider 208, port translator 210, data set assembler 212, tagger 214, data set secure transmitter 216, packet forwarder/timer 218, packet receiver/timer 220, and categorizer and control logic 222. An optional secure receiver 224 is utilized if the ITA 130 receives information or commands back from the network-based firewall 102. All of these modules are preferably software processes, modules, or routines, or alternatively are partly or fully implemented in hardware.

In an example, data packets are transmitted by an application within the host computer 106, such as application 131, toward the destinations reachable via the protected/access network 103, but the identifier/packet receiver 204 intercepts all such packets. For simplicity, only one application is shown, however the host computer 106 is not limited to only one application. The identifier/packet receiver 204 is responsible for identifying the transmitting application, by for example, utilizing the capabilities of the O/S 128 to verify type of application or application name. Thus, the identifier/packet receiver 204 accesses the host computer's O/S 128 for the application name or identifier. The identifier/packet receiver 204 sends the application name or identifier to the checksum calculator and verifier 206 for calculation and verification of a checksum for the application. The checksum calculator and verifier 206 accesses a data storage 207, typically in the host memory 122 (FIG. 1), for an encrypted list of previously calculated and stored application names/identifiers and checksum pairs, and to accomplish a checksum calculation of the currently transmitting application. The obtained information is sent to the checksum calculator and verifier 206, which compares the checksum calculated for the currently transmitting application with the previously stored value to ensure that they match, thus verifying to the identifier/packet receiver 204 that the currently transmitting application is truly the named/identified application. The identifier/packet receiver 204 provides copies of the transmitted packets along with an indication of how many applications are currently active/transmitting to the port translation decider 208. The port translation decider 208, being responsible for making the decision whether or not port translation of the transmitted packets is required to uniquely discriminate the packets from each separate application transmitting, determines from this information whether or not port translation is necessary due to the presence of multiple simultaneously transmitting applications, and if so sends the original non-translated ports information to the data set assembler 212. The port translator 208 also sends information on whether to translate or not to port-translate the data packets to the port translator 210. Data packets for transmission are sent from the identifier/packet receiver to the port translator 210. The identifier/packet receiver 204 sends application name/identifier and associated port information to the data set assembler 212. The data set assembler 212, which is responsible for combining into a data set all the ITA data that is to be transmitted from the ITA 130 to the AIL 140 at the network-based firewall 102, also receives original port information from the port translation decider 208 and any other optional data such as information as to whether the application is active or not, among other information, from the categorizer & control logic 222. The data set assembler 212 assembles the application identification and port information and any other ITA data into a data set. The data set is sent to a tagger 214.

The tagger 214, being responsible for associating the ITA data set with the particular host computer 106 upon which this particular ITA 130 is resident, tags the data set and sends this information to a data set secure transmitter 216, which is responsible for securely transmitting the ITA data set to the AIL 140. The port translator 210 sends port-translated or regular packets to the packet forwarder and timer 218, which is responsible for sending the actual transmitted application packets to the network-based firewall 102, through which they will pass to reach their ultimate destinations, and for timing the period after transmitted packets cease for each application for the categorizer and control logic 222. The packet forwarder 218 sends timer information to the categorizer and control logic 222.

The categorizer and control logic 222 is responsible for categorizing applications as active or non-active, utilizing the initial presence of transmitted packets to change the categorization of a non-active application to active. The categorizer and control logic 222 uses the continuing presence of transmitted packets to retain that active categorization, and subsequently uses timers to discern whether a transmitting application which has stopped transmitting or stopped receiving is likely to resume transmitting/receiving, or has ceased transmitting/receiving for a time period sufficient to indicate that it has become non-active and thus is not likely to transmit/receive in the immediate future. Timers are preferably used since active applications do not generally transmit/receive constantly, but rather do so in bursts, with periods in between these bursts when there is no transmitting/receiving even though the application may not yet have become non-active.

Data packets from the packet forwarder and timer 218 and secure data sets from the data set secure transmitter 216 are sent to the network interface 132 of the host computer 106 for transmission to the network-based firewall 102 via the protected/access network 103. Secure data packet transmissions received at the ITA 130 via the network interface 132 are sent to a packet receiver and timer 220. The packet receiver and timer 220, being responsible for receiving data from the AIL 140 at the network-based firewall 102 and for timing the period after received application packets cease for the categorizer control logic 222, sends the data packets for the application to the designated application 131 (or other appropriate application (not shown)). Timing information from the received data packets is sent from the packet receiver and timer 220 to the categorizer and control logic 222 to aid its categorization function as described above. In an alternative preferred embodiment, secure information, generally meaning information which is authenticated and encrypted, as for example using SSL, SSH, or IPsec, is received at the network interface 132 from the AIL 140 for use at the ITA 130 and is provided to an optional secure receiver 224 for authentication and decryption. This authenticated and decrypted information is sent to the categorizer and control logic 222 for optional purposes including capabilities negotiation, parameter negotiation, additional handshaking, and any other potential information exchanges between the AIL 140 and the ITA 130.

Figure 3:
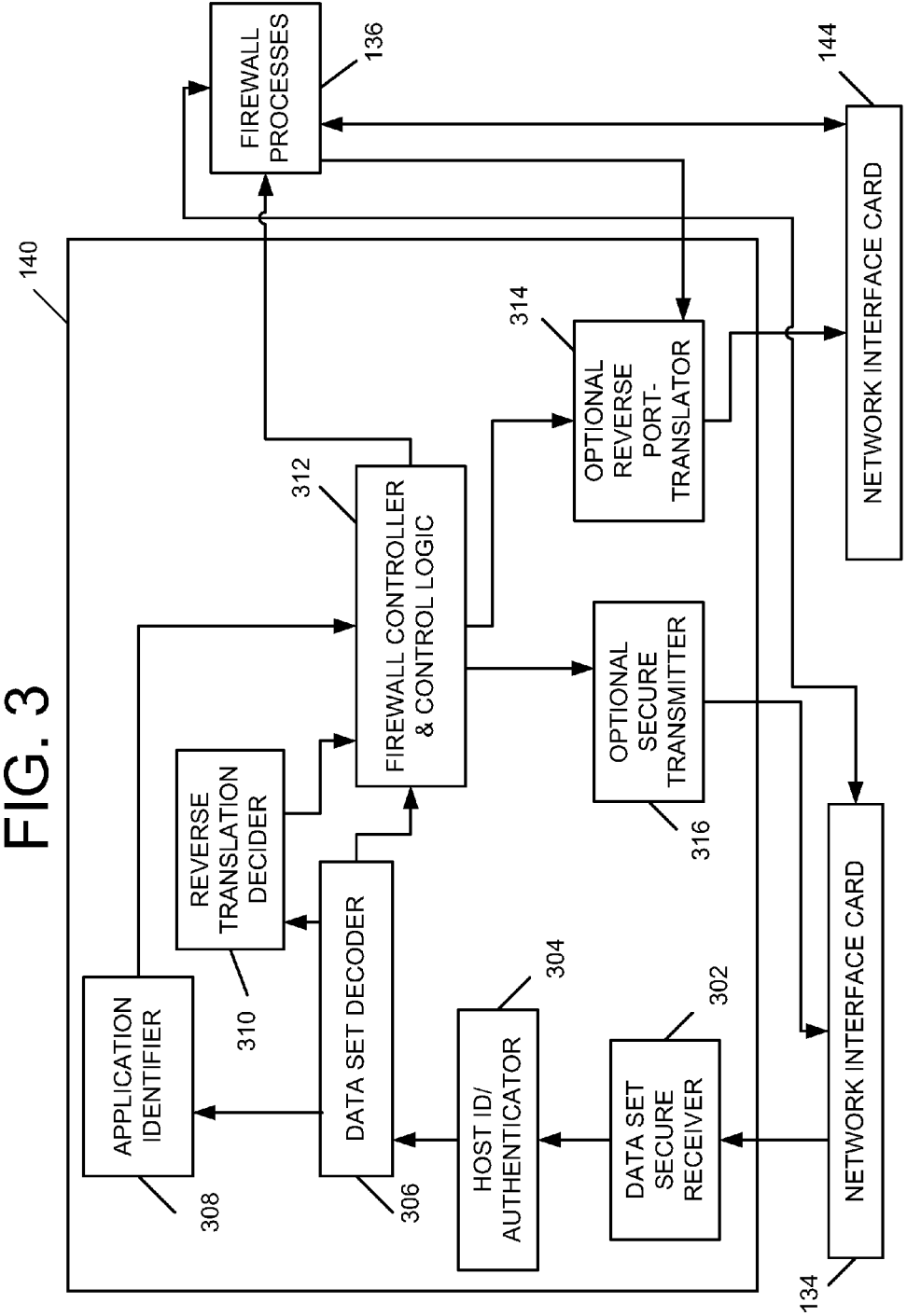
FIG. 3 is a block diagram depicting a preferred embodiment of an application identity listener of a system for network firewall host application identification and authentication.

FIG. 3 is a block diagram depicting a preferred embodiment of logic of an application identity listener (AIL) 140 of a system for network firewall host application identification and authentication. In a preferred embodiment, the AIL 140 resides on the network-based firewall 102, situated so that it can receive communications from the host computer's ITA 130 as well as communicate to and influence the firewall processes 136. Any needed reverse-translation may be implemented and accomplished via the firewall processes 136 since modern firewalls and firewall functions generally include port translation capabilities. In an alternative embodiment when reverse-translation is not done by the firewall function itself via the firewall processes 136, a portion of the AIL 140 is configured separate from the firewall process such that the AIL 140 directly performs any needed reverse-translation function after the firewall processes 136 in order to accomplish reverse-port-translation, or subsequent to the actual firewall filtering. Reverse-port-translation exactly reverses any port translation performed initially by the ITA 130, which may employ port translation as described previously in order to allow the firewall to discriminate the packets arriving at the firewall from different applications that may be transmitting simultaneously, via different ports indicated in the packet headers. Reverse-translation is the process of changing the altered/translated port numbers located in the packet headers back to the original port numbers employed by the transmitting applications 131 through 133 on the host computer 106, those original port numbers being transmitted by the ITA 130 to the AIL 140 in the ITA data set as previously described.

In a preferred embodiment, the AIL 140 includes a plurality of modules such as a data set secure receiver 302, host identifier/authenticator 304, data set decoder 306, application identifier 308, reverse-translation decider 310, firewall controller and control logic 312, and alternately a reverse-port-translator 314. The reverse-port translator 314, as mentioned above, is utilized when the firewall processes 136 via the firewall controller and control logic 312 do not do reverse-translation. In an alternative preferred embodiment, a secure transmitter 316 is used if the AIL 140 on the network-based firewall 102 communicates secure information back to the ITA 130 on the host computer 106 for optional purposes including capabilities negotiation, parameter negotiation, additional handshaking, and any other potential information exchanges between the AIL 140 and the ITA 130. In an example, application-related packets traverse the firewall 102 in both directions, such that application packets travel from the firewall 102 to the host computer 106 as well as from the host computer 106 to the firewall 102, the AIL 140 on the firewall 102 does not necessarily need to communicate with the ITA 130 on the host computer 106. In a preferred embodiment, the ITA 130 on the host computer 106 communicates with the AIL 140 on the firewall 102. All of these modules could be configured as software processes, modules, or routines, or are partly or fully implemented in hardware, using well-known engineering design techniques and practices.

In an example, a secure transmission from the ITA 130 is received via the network interface 134. The network interface 134 sends the data to the data set secure receiver 302, which is responsible for authenticating and decrypting the secure data. The authenticated and decrypted received data set is sent to the host ID/authenticator 304, which is responsible for checking that the host which sent the data set is truly authorized to do so, as for example being included in a pre-provisioned list of hosts which are authorized to communicate with this particular network firewall 102. The host ID/authenticator 304 verifies the data set and sends the verified data set to the data set decoder 306, or if the identified host is determined not be authorized, the data set may optionally be discarded depending on how the AIL 140 has been configured by its administrators/operators. The data set decoder 306, which is responsible for separating the various individual data elements that were combined into a data set by the ITA 130 on the host 106, decodes the data set and sends the original and translated port information to the reverse translation decider 310. Preferably, the reverse translation decider 310 is responsible for determining whether reverse translation is needed based on whether or not original ports information for a particular application's packets was included in the data set, or alternately on whether or not original and translated ports information for a given application's packets are different (since if they match, no reverse translation is needed). The data set decoder 306 also sends application identification, host identification, and ports information to the application identifier 308, which is responsible for uniquely identifying each specific active transmitting application on each specific host. The application identifier 308 performs this function and sends the active application identification information and associated ports to the firewall controller and control logic 312. Any other optional data obtained from the ITA 130 destined for the AIL 140 such as capabilities negotiation, parameter negotiation, additional handshaking, and any other potential information exchanges between the AIL 140 and the ITA 130 is sent to the firewall controller and control logic 312. The firewall controller and control logic 312 is responsible for controlling the firewall processes 136 in such a manner as to allow the extension of the traditional firewall filtering/policy rules to include extended filtering based on the inclusion of application identity as a new filtering parameter. Any associated optional data from the AIL 140 destined for the ITA 130 leaves the firewall controller and control logic 312 and is sent to the optional secure transmitter 316, which is responsible for providing authentication and encryption, for instance via SSL, SSH, or IPsec. The secure transmitter 316 sends the secured data to the network interface 134 for transmission to the host computer's network interface 132. Information regarding whether or not to reverse translate ports is also sent by the application identifier 308 to the firewall controller and control logic 312. The firewall controller and control logic 312 is also preferably responsible for controlling the firewall processes 136 in such a manner as to accomplish any needed reverse port translation, subsequent to filtering, needed to reverse the effect of any port translation originally done by the ITA 130. Outputs from the firewall controller and control logic 312 to the firewall processes 136 will be formatted and implemented to be compatible with the particular firewall implementation. Further, outputs preferably encompass and/ or are based upon, for each packet or set of packets associated with a specific unique application, the necessary group of data elements including active application identification information, original port information and information regarding whether or not to reverse translate ports. In an alternative preferred embodiment, active application identification information, original port information and information regarding whether or not to reverse translate ports information is sent to an optional reverse-port translator 314 that accomplishes any needed reverse port translation directly, independent of the firewall processes 136. Packets destined for the Internet are, in this case, sent from the optional reverse-port translator 314 to the network interface 144. Otherwise, when the optional reverse port translator 314 is not present, data packets to be transmitted to the Internet are sent from the firewall process 136 directly to the network interface 144.

In an example where data packets are transmitted to and from one portion of a protected/access network 103 such as an intranet to another portion of an intranet (i.e., provider network) 104, the data packets can be sent to and from the network-based firewall's network interface 134 to the firewall processes 136 via the protected/access network 103, and flow bi-directionally through the firewall 102 and firewall processes 136 to and from the other intranet portion of the protected/access network 103. Using network firewall host application identification and authentication, the firewall 102, via the ITA 130, AIL 140, and firewall processes 136, provides application-aware filtering whenever the firewall 102 is located between the networks to/from which the transmitted/ received packets pass, such that the firewall includes NICs which connect to any networks or network portions desired.

Figure 4:
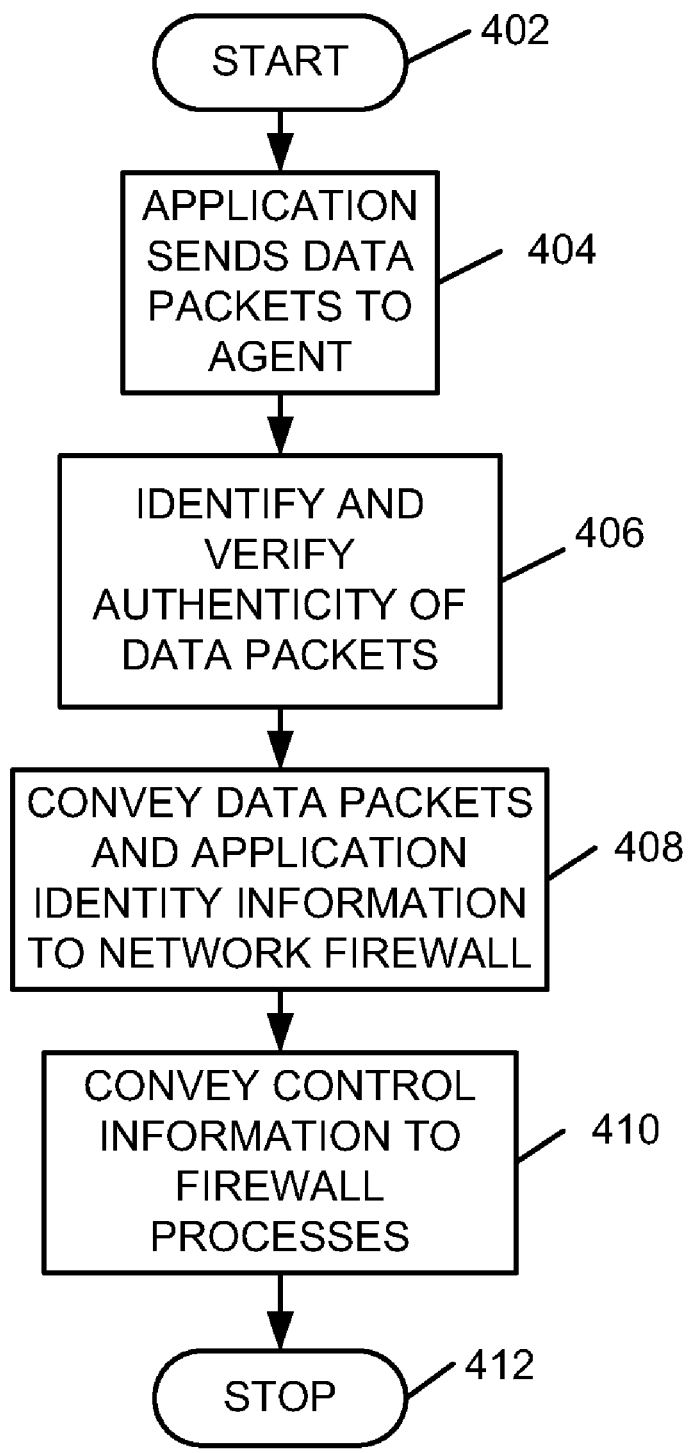
FIG. 4 is a flow chart depicting general functionality, in accordance with a preferred embodiment of an implementation of network firewall host application identification and authentication.

FIG. 4 is a flow chart depicting general functionality (or method), in accordance with a preferred embodiment of an implementation of network firewall host application identification and authentication. The process begins at 402. At 404, an application of a host computer sends data packets that are intercepted by an agent such as the identifying and transmitting agent. At 406, the data packets are verified and authenticated, in terms of verifying that the application sending the packets is authentically what it claims to be. At 408, the data packets as well as the information regarding the authenticated identity of the application are conveyed to the network-based firewall, with the application identify information being conveyed in a secure manner. In a preferred embodiment, the network-based firewall includes an application identity listener that receives the application identity information, while the firewall's existing packet filtering firewall processes receive the application data packets themselves. At 410, the application identity listener preferably controls the existing firewall processes in a manner that adds application awareness by extending the traditional firewall filter/policy rules to include the new parameter of application identity. Subsequently, the filtered-by-application data packets are sent to their ultimate destinations or endpoints, for instance, another computer. Subsequent packets flowing in the reverse direction, i.e. back to the application which started the process, can also be firewalled with the same application awareness utilizing standard stateful-filtering firewall techniques, which will be able to associate all packets related to that particular application and that particular communications session into one group for filtering, as is well-know in the art. The traditional stateful-filtering capability is extended, via the new rule parameters, to include the application identity. The process ends at 412.

Figure 5A:
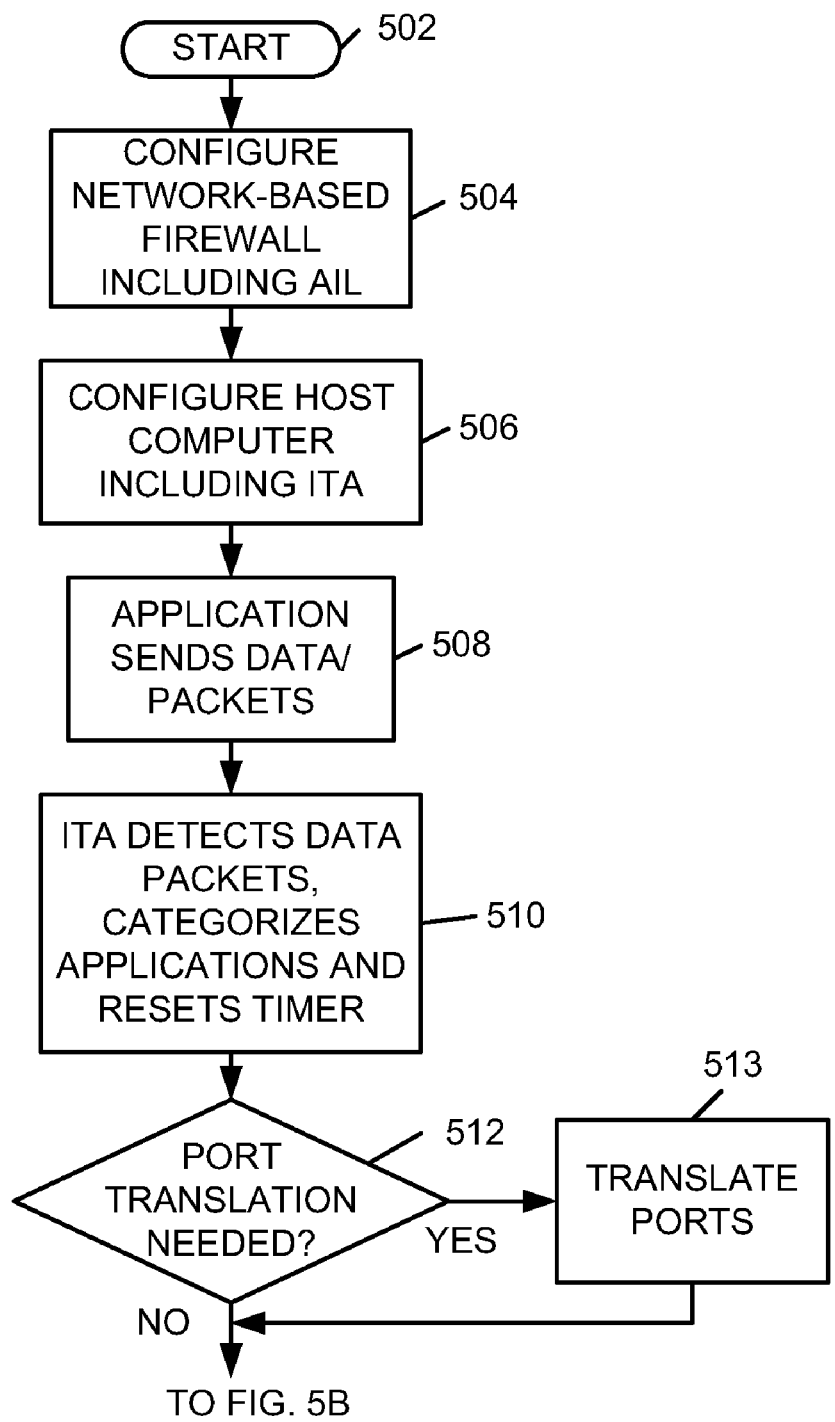
FIGS. 5A and 5B are flowcharts depicting more specific functionality, in accordance with a preferred embodiment, of an implementation of an identifying and transmitting agent of a system for network firewall host application identification and authentication.
Figure 5B:
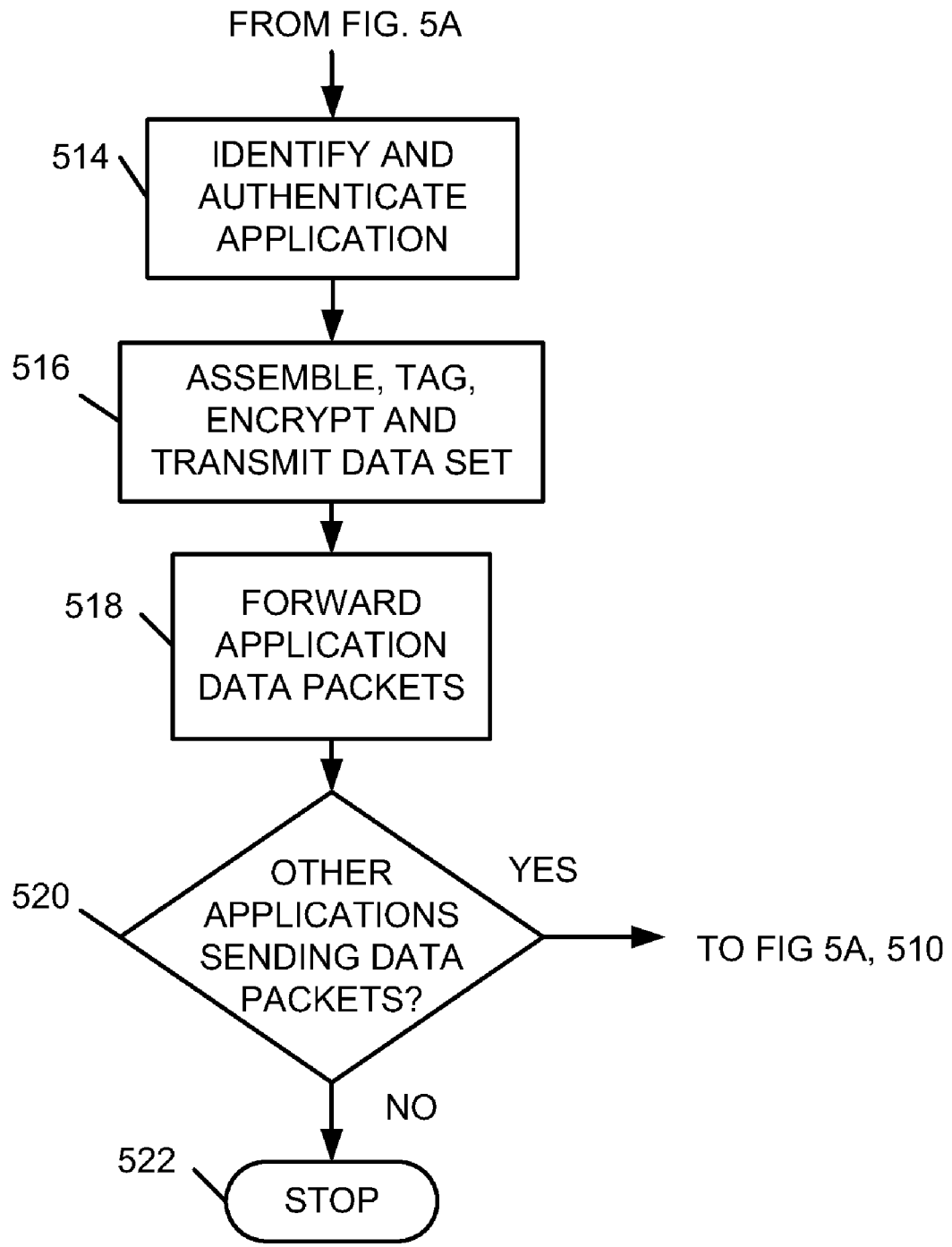

FIGS. 5A and 5B are flowcharts depicting more specific functionality (or methods), in accordance with a preferred embodiment, of an implementation of an identifying and transmitting agent of a system for network firewall host application identification and authentication. The process begins at 502. At 504, a network-based firewall is configured including an application identity listener (AIL). In a preferred embodiment, a system administrator configures the network-based firewall. At 506, a host computer is configured including an identifying and transmitting agent (ITA). A user or system administrator, among others can configure the host computer. At 508, an application associated with the host computer sends data packets. Typically, the data packets traverse across a network or sequence of networks, such as an access network and subsequently a provider network that may include or connect to the Internet to another application, often of same or similar type, on another processing device. In an example, the transmitted data packets are sent to a network-based firewall before reaching the recipient application such that appropriate security measures can be taken.

At 510, the ITA detects the data packets, categorizes the applications and resets application timers. Applications are categorized as active or non-active since one aspect of the application awareness that is to be provided to the network-based firewall is that it should only allow packets from active applications to pass, whereas any packet which attempts to flow through the firewall from another application, not specifically active, should be blocked. The ITA provides application identity information to the network-based firewall for active applications. Further, the ITA conveys an indication via a secure data set to the firewall whenever an active application becomes non-active, so that the firewall can immediately block any further packets that appear to be associated with that application, but which may actually be packets sent by hackers attempting to get through the firewall by mimicking characteristics of allowed packets. Timers are useful in this active/non-active categorization, as described previously, since applications do not typically transmit packets continuously, for example, much of the time they are receiving packets, or are waiting for some event or input. For instance, a countdown timer could be used for each application in order to aid the ITA in determining whether that particular active application should still be considered active even though is not currently transmitting packets. In an alternative preferred embodiment, multiple timers are used for each application, or for certain types of applications, or for applications that behave in certain ways as observed by the ITA, or optionally as notified by the AIL on the network-based firewall. The setting(s) of the timer(s) could depend on user configuration, type of application, among other factors. The default or configured timer settings may be static, or else dynamic (i.e., continuously modified by the ITA based on detectable trends in transmit periods, receive periods, wait periods, or ratios between these or other periods of time). For instance, if the duty cycle (e.g., the ratio of transmit to non-transmit periods) decreases, the timer setting could be increased to reflect the trend of increasing receive or wait times. Timers can be reset at appropriate times, such as when the application initially becomes active. Timers are triggered to start counting down when an active application ceases transmitting, or ceases receiving, or after a relatively short period subsequent to ceasing.

At 512, the ITA determines whether port translation is necessary. Port translation may be necessary if there are multiple applications on the same host simultaneously transmitting with the same ports indicated in the transmitted packet headers. The firewall can easily discriminate packets associated with different hosts via their IP addresses in the packet headers, but the firewall preferably must have some way to discriminate packets associated with different applications resident on the same host. Thus the ports, if identical for multiple applications, are translated to ensure that each application's packets have a unique port indicated in their headers. If yes, at 513, the ITA port-translates packets originating from an active application(s) before forwarding them to the provider network en route to the AIL. The ITA may translate the source port, destination port, or both. If port-translation is used, the ITA records the original port prior to translation, especially if the destination port is being translated. This is necessary so that a reverse-translation can later be accomplished if required. If the destination port is translated, reverse translation is required since that is the specific port on which the ultimate recipient of the packet will be listening. However, depending on the application, reverse translation may not be needed if only the source port is translated, although it may be safest to perform the reverse translation in either case. Preferably, the new port numbers placed in a packet header are chosen to avoid standard known port numbers, especially the widely known low numbered ports. For instance, the new ports could be chosen from among a wide range of available high numbered ports, chosen randomly or in any particular order, as long as unique port numbers are used for different applications. In an alternative preferred embodiment, the ITA utilizes the port-translation option at a command or configuration of the user, or when multiple applications are active that send packets using the same port numbers. In the case where port-translation is used when multiple applications using the same ports are active, then the ITA identifies the active applications prior to effecting the port translations in order to be able to decide when to port-translate and when not to port-translate. Application identification prior to port translation is preferred to ensure that proper port translation is achieved when multiple applications are actively transmitting packets. Additional high-level/application-level options may reasonably include information which might be securely transmitted back to the host agent ITA from the network-based firewall AIL, and thus would need to be securely received and utilized by the ITA. Such information might include (or result from) acknowledgements of data received (i.e., in addition to acknowledgements already included as part of the secure connection method), handshaking to agree on available functions or capabilities in the AIL and/or ITA, configuration data needing to be conveyed to one entity due to direct configuration changes on the other entity (e.g., by the user on the host/ITA, or by the firewall/AIL administrator), and any requests by one entity for more information from the other entity. If port translation is not necessary, the process continues on FIG. 5B.

Referring to FIG. 5B, at 514, the ITA identifies the application (or software process) originating those data packets and authenticates the applications. The ITA can use the capabilities of an operating system, such as Unix, Linux, or Windows operating systems to accomplish the identification of the application. In a preferred embodiment, the applications are identified by type of application or process name. A consideration in determining the best method to identify the application is whether a Trojan or other mal-ware can be designed to re-name itself to a common and/or "authorized" application name. For instance, Trojans can re-name themselves to masquerade as common web browsers (e.g., "netscape.exe" or "explorer.exe"), which are almost always "authorized" to communicate to the network. Thus, in a preferred embodiment, the ITA calculates checksums of each application when the application is initially installed, when new applications are installed, at periodic intervals, at user command, or when otherwise necessary, and associates those checksums with the names of those applications. Detecting an actively transmitting application's name serves to "identify" that host application. The calculation of checksums provides additional security measures since the ITA later checks that an active application (i.e., transmitting packets) has the correct name by re-calculating the checksum and comparing it with the previously stored checksum for that application name. If the two checksums do not match, then the ITA identifies that application as a re-named rogue (i.e., by definition "unauthorized") and ultimately sends such identifying information to the network-based firewall's application-identity listener, so that the network-based firewall knows to block the transmitted packets from that application. In an alternative preferred embodiment, as an alternative to checksums, the ITA utilizes cryptographic message digest algorithms, sometimes termed "hash algorithms," or algorithms that include message digest algorithms, to calculate "cryptographic checksums" for the applications. In an example, "cryptographic checksums" provide increased security over traditional checksums, and are easy-to-use methods.

In an example, the ITA's use of a traditional checksum serves to authenticate the host application. The ITA's alternate use of a cryptographic checksum serves to more strongly authenticate the host application. Identification and authentication of the host application conveyed to the network-based firewall is utilized to enable "application filtering."

At 516, subsequent to (a) application identification, (b) association of ports used by each application, (c) any optional decisions regarding whether to port-translate packets, and (d) determination of original port numbers when the port-translation option is in effect, the ITA assembles all this information into a data set, and tags it with the identity of the host on which the ITA resides. At 518, the ITA securely transmits the tagged data set preferably to the AIL on the network-based firewall. A number of known methods for formatting assembly of the data set and formatting and tagging the data set can be used, including simple structured concatenation. Transmission of the tagged data set can be performed utilizing known methods that include authentication and encryption, such as standard SSL (Secure Sockets Layer), TLS (Transport Layer Security), SSH (Secure Shell), or IPsec (IP Security) methods, among others. Non-secure transmission can be used as an alternative method of transmission, however not-secure transmissions may cause the system to be susceptive to attack due to interception, modification, or falsification of the non-secure transmission. Non-standard secure methods can also be used as an alternative, but are not consistent with best practices in the security community.

At 520, the ITA continues to watch for any currently inactive application (or software process) to begin to transmit packets, at which point that application becomes an active application. When any application becomes active, the process continues at step 510, FIG. 5A. An application remains active while it is transmitting packets, or until a configurable timer or timers expire. Timers are useful in determining whether an application is active or inactive. For example, when a countdown timer for an active but currently non-transmitting application reaches zero, that application can be declared inactive. Optionally, one or more secondary timers could be used, possibly reset at the beginning of each transmit period and separately triggered when transmission and reception ceases. If no additional applications send data packets, the process ends at 522.

Figure 6A:
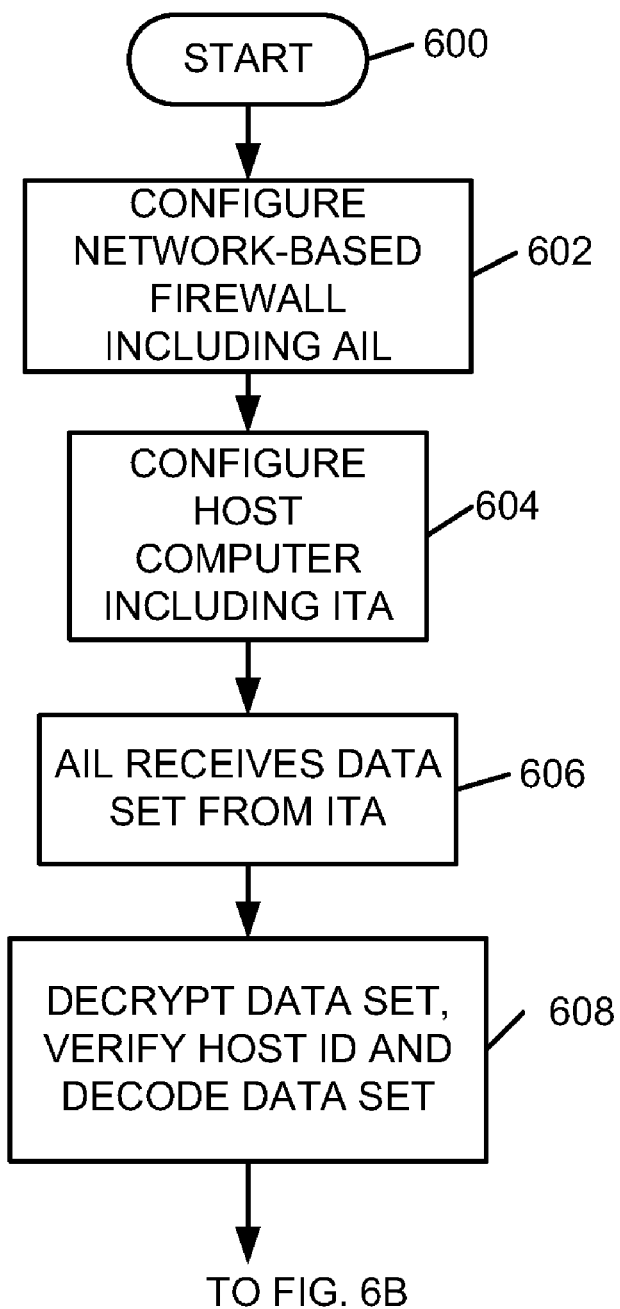
FIGS. 6A and 6B are flowcharts depicting more specific functionality, in accordance with a preferred embodiment, of an implementation of an application identity listener of a system for network firewall host application identification and authentication.
Figure 6B:
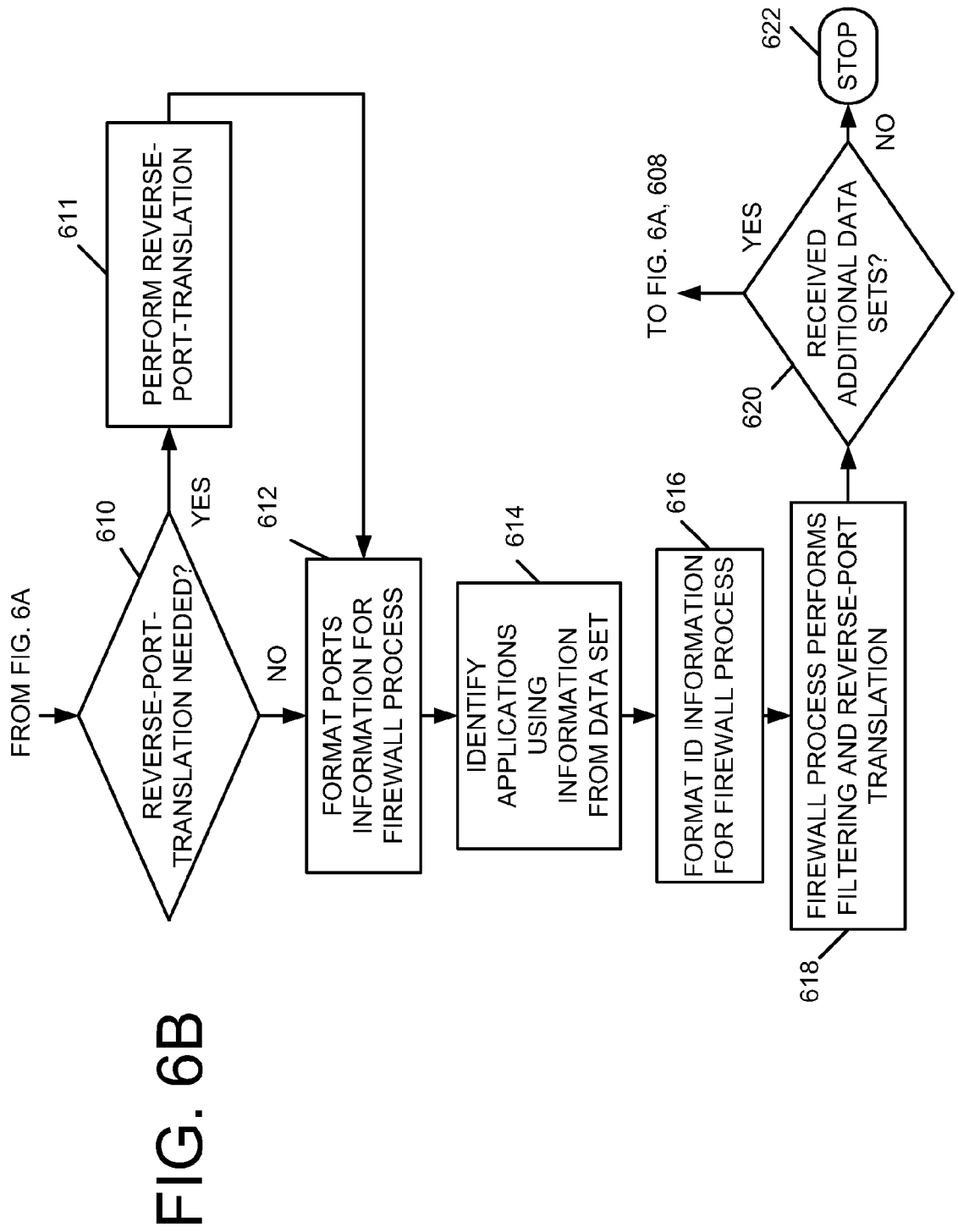

FIGS. 6A and 6B are flowcharts depicting more specific functionality (or methods), in accordance with one preferred embodiment, of an implementation of an application identity listener of a system for network-based firewall host application identification and authentication. The process begins at 600. At 602, the network-based firewall is configured including the AIL, if not previously configured. At 604, the host computer is configured including the ITA, if not previously configured. At 606, the AIL receives the data set, preferably secure data packets from the ITA. At 608, the AIL decrypts the secure data set using the same method by which it was securely sent (e.g., SSL, TLS, SSH, IPsec). Decrypting the data set can include a cryptographic authentication function (e.g., in the cases of SSL, TLS, SSH, IPsec) to ensure authenticity of the communication. In an example, the data set is in "cleartext" (i.e., unencrypted) form, which is accessible to subsequent AIL modules. The AIL extracts the host identification with which the ITA tagged the communicated data set. The AIL compares the extracted host identification information with a configured list of hosts. If the identified host is present in the host list, that host is itself considered authenticated and the AIL will proceed to decode the communicated data set, that is extracting or obtaining each part of the data set for use as appropriate, including those portions of data associated with application identity and associated ports, and original ports translated including source, destination, or both and the port number(s). The process continues on FIG. 6B.

Referring to FIG. 6B, at 610, the AIL determines based on the presence or absence of original port information for each active application indicated in the communication from the ITA, whether reverse-port-translation is needed. If reverse-translation is needed, at 611, the AIL performs a reverse-port translation function. In an example, the AIL performs this function by determining what packet ports need to be reverse-translated for each application and into which original port number(s). If reverse-port-translation is not necessary, at 612, the AIL formats ports information for use by the firewall process in a manner as to be compatible with the particular firewall design and implementation. At 614, the AIL identifies the active application(s), based on the decoded application information. At 616, the AIL formats identification information for use by the firewall process in a manner as to be compatible with the particular firewall design and implementation. In a preferred embodiment, the AIL controls the firewall process by for example, informing the firewall process of the details of each active application. In an example, additional optional information might be securely transmitted back to the ITA from the AIL. Such information might include or result from acknowledgements of data received (i.e., in addition to acknowledgements already included as part of the secure connection method), handshaking to agree on available functions or capabilities in the AIL and/or ITA, configuration data needed to be conveyed to one entity due to direct configuration changes on the other entity (e.g., by the user on the ITA, by firewall processes or AIL administrator), and any requests by one entity for more information from the other entity.

At 618, the firewall process performs a variety of security functions such as packet filtering and reverse-port-translations. Subsequent to application aware firewall filtering of preferred embodiments of the invention, if reverse-port-translation is needed, the AIL controls or informs the firewall process to perform reverse-port-translation, causing the translated port numbers in the data packet headers to be replaced with the original port numbers as required. Alternatively, a separate module of the AIL can perform reverse-port-translation after the firewall process has been completed. In an example, the firewall process can pass or block data packets as indicated by its configured rule set. In a preferred embodiment, the rule set is "application aware," and data packets from "authorized" applications are allowed to pass through while data packets from "un-authorized" applications or re-named rogue applications are blocked. In an example, rogue or re-named applications can be identified by the ITA in any reasonable manner, for instance by being denoted as "rogue_XXXXXXXX" where XXXXXXXX is a unique sequential number (subject to rollover when its numerical space is exceeded), and thus easily recognized by the AIL. A specific rule to block rogue applications is not theoretically needed in the firewall process itself, but rather can be an implied rule. Alternatively, so that this blocking can be temporarily turned off for troubleshooting purposes, the firewall design may include an explicit rule to block rogue traffic, which can be included as a default rule. The "application aware" capability and action can be in addition to, or as an alternate to, traditional firewall operations, such as packet filtering, stateful filtering, application proxy, etc.

At 620, if additional data sets are received at the AIL, the process continues at step 608 of FIG. 6A. If no additional data sets are received at the AIL, the process ends at 622.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

In a preferred embodiment of the invention, application aware filtering and rogue blocking is able to stop Trojan or mal-ware traffic outbound from the host, thus removing firewall "leakiness" and ensuring maximum security for the user. Further, application aware filtering and rogue blocking can also block unallowed commercial "spyware", thus increasing user privacy and giving the user better knowledge of and control over the actions of this software.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for providing host application identification and authentication to a network based firewall, comprising:
   a host computer comprising a first processor, a first memory coupled to the first processor, and an identifying and transmitting agent;
   a network-based firewall device comprising a second processor, a second memory coupled to the second processor, and an application identity listener, wherein the network-based firewall device is coupled to the host computer via a protected network, wherein the network-based firewall device is coupled to a provider network, and wherein the network-based firewall device serves as a conduit between the host computer and the provider network;
   wherein the identifying and transmitting agent executes in the first processor from the first memory and, when executed by the first processor, causes the host computer to
      detect data packets transmitted by an application executing on the host computer and destined for the provider network,
      responsive to detecting transmission of the data packets, categorize the application in an active categorization, the active categorization indicating that the application is actively transmitting the data packets,
      responsive to detecting transmission of the data packets, reset a timer for determining whether the application should be re-categorized from the active categorization to a non-active categorization, the timer configured to expire after a length of time in which no additional data packets are transmitted from the application, the non-active categorization indicating that the host computer is not considered to be actively transmitting the data packets,
      determine an identification of the application transmitting the data packets,
      compare a checksum of the identification with a stored checksum to verify that the application is authentic,
      assemble a data set comprising the identification of the application, the categorization of the application, associated ports information utilized by the application including translated ports information if ports have been translated, and original ports information if the ports have not been translated,
      tag the data set with an identity of the host computer, and transmit the tagged data set to the network-based firewall device via the protected network; and
   wherein the application identity listener executes in the second processor from the second memory and, when executed by the second processor, causes the network-based firewall device to
      receive the tagged data set from the host computer via the protected network,
      disassemble the data set to retrieve the identity of the host computer, the identification of the application, the categorization of the application, the associated ports information utilized by the application including translated ports information if ports have been translated, and original ports information if the ports have not been translated,
      compare the identity of the host computer in the tagged data set to a pre-provisioned list of hosts to verify that the host computer is authorized to communicate with the provider network, and
      filter transmission of the data packets via the provider network based on the identification of the application and the categorization of the application.

2. The system of claim 1, wherein the network-based firewall device is further configured to provide application-aware packet filtering.

3. The system of claim 1, wherein the identifying and transmitting agent further comprises an identifier/packet receiver, a checksum calculator and verifier, a port translation decider, a port translator, a data set assembler, a tagger, a data set secure transmitter, a packet forwarder/timer, a packet receiver/timer, a categorizer and control logic, and a data set receiver.

4. The system of claim 1, wherein the application identity listener further comprises of a data set secure receiver, a host identifier/authenticator, a data set decoder, an application identifier, a reverse-translation decider, a firewall controller, a reverse port translator, and a command information transmitter.

5. The system of claim 1, wherein the identifying and transmitting agent further causes the host computer to encrypt the data set prior to transmission to the network-based firewall device via the protected network, and wherein the application identity listener further causes the network-based firewall device to decrypt the encrypted data set upon receiving the encrypted data set from the host computer via the protected network.

6. The system of claim 1, wherein the application identity listener is further configured to inform a firewall process of a unique identity of each active application on a given host.

* * * * *